(12) United States Patent
Shepard et al.

(10) Patent No.: US 7,785,691 B2
(45) Date of Patent: Aug. 31, 2010

(54) FLEXIBLE BUILDING CONSTRUCTION LAMINATES WITH FASTENERS

(75) Inventors: William H. Shepard, Amherst, NH (US); George A. Provost, Litchfield, NH (US)

(73) Assignee: Velcro Industries B.V., Curacao (AN)

( * ) Notice: Subject to any disclaimer, the term of this patent is extended or adjusted under 35 U.S.C. 154(b) by 0 days.

(21) Appl. No.: 10/524,881

(22) PCT Filed: Aug. 20, 2003

(86) PCT No.: PCT/US03/26221

§ 371 (c)(1),
(2), (4) Date: Oct. 19, 2005

(87) PCT Pub. No.: WO2004/018796

PCT Pub. Date: Mar. 4, 2004

(65) Prior Publication Data

US 2006/0154017 A1      Jul. 13, 2006

Related U.S. Application Data

(60) Provisional application No. 60/404,722, filed on Aug. 20, 2002, provisional application No. 60/443,093, filed on Jan. 28, 2003.

(51) Int. Cl.
*B32B 3/06* (2006.01)
*B32B 9/00* (2006.01)

(52) U.S. Cl. .................. 428/99; 428/100; 428/101; 428/102

(58) Field of Classification Search ........... 428/99–102, 428/153
See application file for complete search history.

(56) References Cited

U.S. PATENT DOCUMENTS

| 4,012,544 A | 3/1977 | Richards |
| 4,974,384 A | 12/1990 | Pacione |
| 5,116,439 A | 5/1992 | Raus |
| 5,124,366 A | 6/1992 | Gluck et al. |
| 5,133,166 A | 7/1992 | Pacione |
| 5,224,895 A * | 7/1993 | Franz ..................... 446/321 |

(Continued)

FOREIGN PATENT DOCUMENTS

DE      2263375 A1      7/1974

(Continued)

OTHER PUBLICATIONS

Communication from a foreign patent office in a counterpart application (Communication pursuant to Article 96(2) EPC, App. No. 03 793 169.8-1256), May 30, 2007.

(Continued)

*Primary Examiner*—Lynda Salvatore
(74) *Attorney, Agent, or Firm*—Fish & Richardson P.C.

(57) ABSTRACT

A material for covering a surface of a home or building is provided in the form of a flexible laminate having a fastening side comprising a sheet-form fastener component, and an opposite side formed by a sheet of paper laminated to the fastener component to increase the dimensional stability of the fastener component for covering and fastening over a wide area. The fastener component can have either hooks or loops. The laminate is particularly useful for laying flooring with low backlash between adjacent pieces.

35 Claims, 4 Drawing Sheets

U.S. PATENT DOCUMENTS

| | | | | |
|---|---|---|---|---|
| 5,260,015 | A | 11/1993 | Kennedy et al. | 264/167 |
| 5,658,430 | A | 8/1997 | Drake, Jr. et al. | |
| 5,723,195 | A | 3/1998 | Pacione | |
| 5,744,080 | A * | 4/1998 | Kennedy et al. | 264/167 |
| 5,802,676 | A | 9/1998 | Tolan | |
| 5,804,273 | A | 9/1998 | Drake, Jr. et al. | |
| 5,849,387 | A | 12/1998 | Drake, Jr. et al. | |
| 5,891,547 | A | 4/1999 | Lawless | |
| 6,044,525 | A | 4/2000 | Sastre et al. | |
| 6,083,596 | A | 7/2000 | Pacione | |
| 6,205,623 | B1 | 3/2001 | Shepard et al. | |
| 6,235,369 | B1 | 5/2001 | Shepard et al. | |
| 6,250,001 | B1 | 6/2001 | Gillespie | |
| 6,298,624 | B1 | 10/2001 | Pacione | |
| 6,306,477 | B1 | 10/2001 | Pacione | |
| 6,329,016 | B1 | 12/2001 | Shepard et al. | |
| 6,342,285 | B1 * | 1/2002 | Shepard et al. | 428/88 |
| 6,365,258 | B1 | 4/2002 | Alm | |
| 6,460,303 | B1 | 10/2002 | Pacione | |
| 6,481,063 | B2 | 11/2002 | Shepard et al. | |
| 6,526,704 | B1 | 3/2003 | Berard et al. | |
| 6,797,353 | B1 | 9/2004 | Pacione | |
| 7,048,818 | B2 | 5/2006 | Krantz et al. | |
| 7,160,600 | B2 | 1/2007 | Shepard et al. | |
| 7,194,843 | B2 | 3/2007 | Pacione | |
| 2002/0019206 | A1 * | 2/2002 | Deka et al. | 451/526 |
| 2003/0233777 | A1 | 12/2003 | Hammer | 40/611.01 |
| 2004/0121694 | A1 | 6/2004 | Shepard et al. | |

FOREIGN PATENT DOCUMENTS

| | | |
|---|---|---|
| DE | 19752819 A1 | 6/1999 |
| EP | 0146012 A2 | 6/1985 |
| EP | 1795654 A2 | 6/2007 |
| WO | WO 9911452 * | 3/1999 |
| WO | WO 00/73063 | 12/2000 |
| WO | WO01/67911 | 9/2001 |
| WO | WO01/81771 | 11/2001 |
| WO | WO2009025650 A1 | 2/2009 |

OTHER PUBLICATIONS

PCT/US2009/040003; Notification of Transmittal of the International Search Report and the Written Opinion of the International Searching Authority, or the Declaration (3 pages); Interntional Search Report (4 pages) Written Opinion of the International Searching Authority (8 pages) dated Jul. 7, 2009.

U.S. Examiner Chi Q. Nguyen, USPTO Office Action in U.S. Appl. No. 12/240,741, mailed Aug. 7, 2009, 13 pages.

* cited by examiner

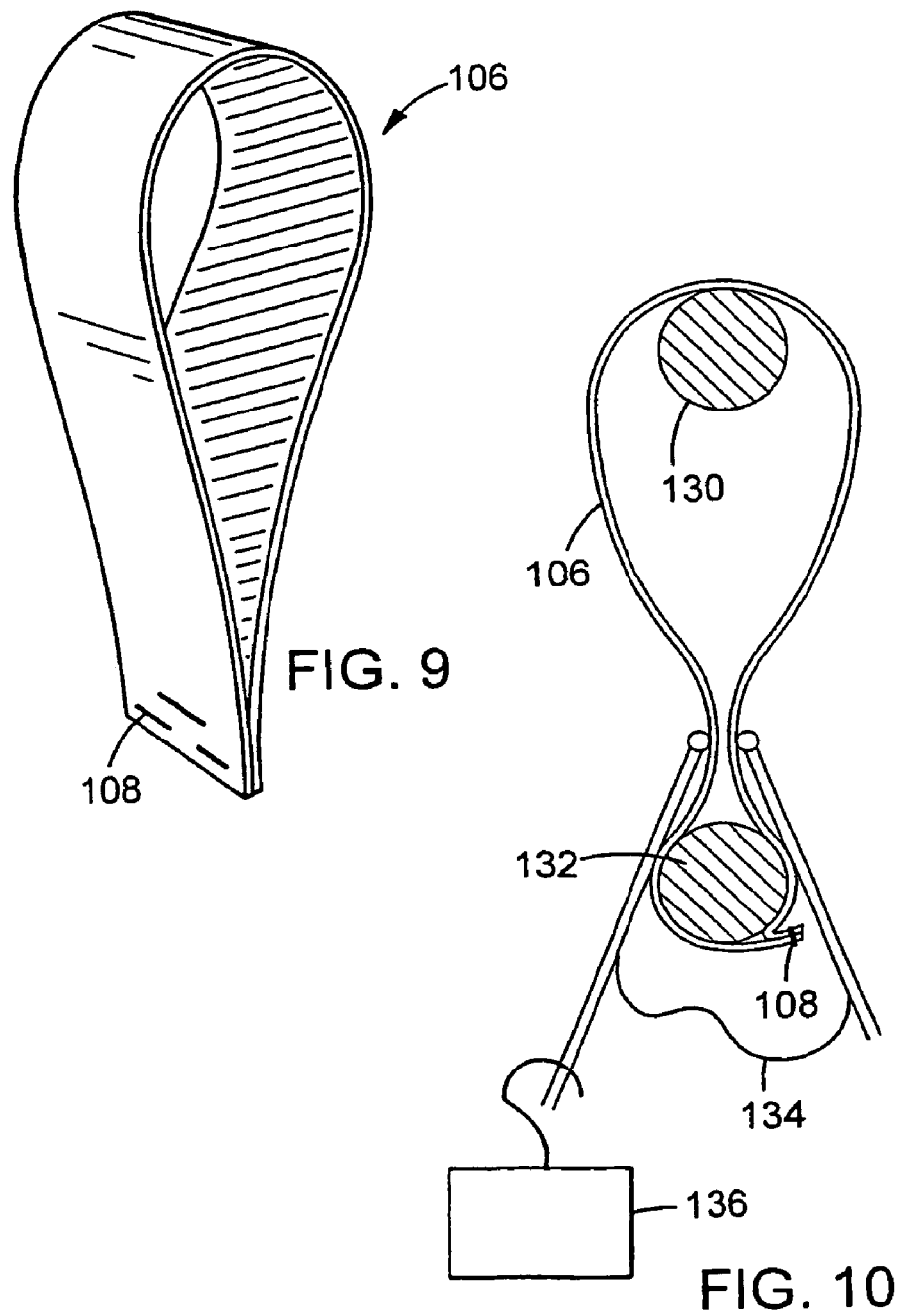

FLEXIBLE BUILDING CONSTRUCTION LAMINATES WITH FASTENERS

This application is a national phase application filed under 35 U.S.C. §371, from PCT application US2003/26221, filed Aug. 20, 2003, claiming priority from U.S. provisional applications 60/404,722, filed Aug. 20, 2002, and 60/443,093, filed Jan. 28, 2003.

BACKGROUND

This invention relates to touch fastener laminates, such as laminates having either hooks or loops, for securing flooring and other surfaces over wide areas.

The potential usefulness of hook and loop fastening systems to secure finish materials to wide area surfaces was recognized long ago. For example, German Registered Utility Model DE-U-7029524, May 8, 1970, to Velcro France, suggested the fastening of flexible and rigid finishing materials to walls, floors and ceilings. Development of a tool to prevent premature engagement of the hook and loop fasteners when positioning a rigid member on a rigid surface was also known, see U.S. Pat. No. 3,475,810, to Velcro, Inc. For attaching carpets, it was proposed in 1979 in British Patent 1,546,901 to secure long loops to a light fabric by deep needle punching and to attach that fabric to the surface of an underlayment of hair felt or resilient foam. Over the years, others have focused on the same potential for hook and loop fasteners for wide surfaces, see e.g. U.S. Pat. Nos. 3,817,015; 4,649,069; 4,744,189; 4,810,546; 4,822,658; 4,974,384; 5,042,221; 5,060,443; DE 4228597 (published application), and U.S. Pat. Nos. 5,191,692; 5,482,755; 6,298,624; 6,306,477 and 6,460,303.

Despite this, little commercial use has been made of hook and loop fastening to secure finish materials on wide surfaces, due to lack of hook and loop fasteners of appropriate function and cost.

SUMMARY OF THE INVENTION

One aspect of the invention features a material for covering a surface of a home or building. The material is in the form of a flexible laminate having a fastening side comprising a sheet-form fastener component, and an opposite side formed by a sheet of paper laminated to the fastener component to increase the dimensional stability of the fastener component for covering and fastening over a wide area.

In some cases, the sheet-form fastener component is in a laterally stretched condition as laminated to the paper.

Preferably, the paper has a lateral stiffness at least as great as that of 85 pound raft paper, for example.

In one set of preferred embodiments, the sheet-form fastener component includes an array of male fastener elements, such as hook-shaped fastener elements, suitable for engaging a field of loops. In some cases, the fastener elements have molded resin stems integral with a resin base layer extending across the fastener component and laminated to the paper. Preferably, the base layer is laminated to the paper by resin of the base layer that encapsulates surface features of the paper.

In another set of preferred embodiments, the sheet-form fastener component has a field of hook-engageable loops. In some embodiments, the hook-engageable loops are defined by a non-woven web material, such as a non-woven web of entangled fibers forming a sheet-form web body stabilized in a condition of at least about 50 percent areal stretch, or at least about 20 percent areal stretch. Preferably, hook-engageable loops extend in clusters from tightened entanglements within the web body, the entanglements being joined together by straightened fibers. The web product preferably has a basis weight of less than about 4 ounces per square yard, with at least some of the fibers having a fiber denier of less than 3.

In some embodiments, the web material includes a binder resin anchoring hook-engageable fibers or yarns and constituting between about 20 percent and 40 percent of the weight of the material.

In some cases, the laminate material also includes an adhesive disposed on a broad side of the paper opposite the fastener component. The adhesive could be heat-activatable, for example, or pressure sensitive and covered by a removable protective layer.

For some applications, the laminate material is provided in roll form. For some purposes it is preferred to have the fastening side directed inwardly, for ready deployment against a surface to be covered. For minimizing edge curl, it can be useful to roll the laminate with the fastening side directed outwardly.

For some applications, the paper has an exposed surface suitable for printing or writing.

Several aspects of the invention feature a hook and loop flooring attachment system employing a loop or hook laminate material that remains sufficiently dimensionally stable to enable inexperienced home owners to lay a hardwood or engineered flooring strips or other rigid flooring materials, such as parquet or stone tiles, and results in particularly low backlash in the resulting engagement.

An aspect of the invention is provision of a broad-area coverage hook and loop fastening system which functions by important interaction at two levels, to provide the critical micro-limitation on freedom of movement of each individual flooring strip or unit that makes up a floor or other finish surface, so that in effect each is "micro-articulated" relative to its neighbors, but to provide X-Y stability of the assembly taken as a whole. Preferably, the X-Y stable sheet has no appreciable three-dimensional rigidity, so that it is able to conform to changes in the supporting surface as occurs with floor sag on floors, wind deflection on exterior walls, snow loads on roofs, settlement and warping of interior walls, etc. In this manner, a floor or wall surface can be uneven and still may be given a pleasing finish at reasonable cost.

Another aspect of the invention is a flooring system formed of rigid members in which the members forming the finish surface, themselves, are not rigidly joined, but rather, on a microscopic level, each individual member, though strictly confined, is still permitted a critically limited amount of X-Y "float" relative to its immediate neighbors. The dual layers of the composite system, comprised of the assembly of flooring strips or other finished members atop the primary component of the hook and loop fastening can behave as an entity. If the primary fastener component is not secured to the surface on which it rests, the entity may have desirable free-floating behavior.

According to another aspect of the invention, a method of securing an object over a broad surface of a home or building includes permanently securing a primary touch fastening material to the broad surface. The material is notably in the form of a flexible laminate having a fastening side comprising a sheet-form fastener component, and an opposite side formed by a sheet of paper laminated to the fastener component to increase the dimensional stability of the fastener component. A complementary fastener component is provided on the object to be secured, and then the object is placed against the primary touch fastening material to releasably secure the object in place.

In some particularly useful embodiments, the broad surface is a subfloor, and the object is a discrete piece of flooring to be secured to the subfloor. Preferably, the sheet-form fastener component and the complementary fastener component are both selected to provide a backlash between adjacent pieces of flooring, when one of the adjacent pieces is subjected to a separating load of 10 pounds, of less than about 0.020 inch, preferably less than about 0.015 inch. The backlash is also preferably at least 0.001 inch, for reasons discussed above.

Various features of earlier-discussed aspects of the invention also apply to the method of the invention.

In some cases, the method includes unrolling the primary touch fastening material directly onto the broad surface to be covered.

The inventors have realized that laminating paper to the back of the base layer of a molded hook, such as producible by the techniques described herein, can produce a significant benefit not previously exploited. The X-Y plane stability of common, low cost, 85 pound Kraft paper laminated in situ to the base layer of hook material being molded, renders a hook material useful in new ways. Absent such laminating, molded hook tape is somewhat pliable and distortable, but when combined in a composite, excellent dimensional stability and strength in the X-Y plane is achieved. Furthermore, by intentionally reducing the thickness of the base resin layer of the hook material, the cost of the hook material goes down because of use of less molding resin.

Even with such reduction, the X-Y stability obtained by the in situ paper laminate is found to produce better properties for a hook product in many respects than obtained with the more expensive full resin thickness. Such in situ paper laminate is found to produce an excellent anchor or primary securing layer for floor and building construction applications, when hook size and areal density are suitably chosen.

The X-Y stability contributed by the paper enables the field of hooks to be laid down and cut to size, to readily conform to the shape of a room, the stabilizing effect of the low-cost paper in the laminate preventing wrinkling and bubbles. It's new nature also facilitates handling of the hook product by rolling it in dependably smooth rolls. Likewise, the paper contributes to the ability to apply tension on edges of the laminate when adjusting the position of the composite.

Other objects, aspects and advantages of the invention will be apparent from the following description of embodiments, and from the claims.

BRIEF DESCRIPTION OF THE DRAWINGS

FIG. 9 is a perspective view of a test strip for testing bend radius.

FIG. 10 shows the test strip of FIG. 9 being loaded to determine its bending properties.

Like reference symbols in the various drawings indicate like elements.

DETAILED DESCRIPTION

Figure 1:
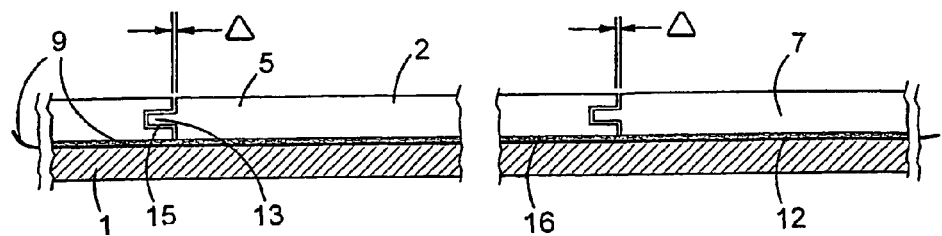
FIG. 1 is a side view of installed tongue and groove flooring strips with a hook and loop fastening system.

FIG. 1 shows three rigid composite flooring strips 2, 5, and 7 that are installed using a hook and loop fastening system. Each of the composite flooring strips 2, 5, and 7 has tongue 13 and groove 15 that locks with its neighbor flooring strip without adhesive. This locking using tongue and grooves prevents movement in the horizontal direction. Movement in the vertical direction is prevented by the weight of the floor strips and a hook and loop fastening system. This fastening system comprises loop defining thin non-woven material 12 with a paper backing 9 that rests on rigid floor 1. The fastening system also comprises hooks 16 on the bottom side of floor strips 2, 5, and 7. Floor strips 2, 5, and 7 comprise a composite of flooring strip and hooks 16 on the bottom of each flooring strip. Hooks 16 detachably attach to the loops of material 12 to provide the hook and loop fastening system. The hook and loop fastening system also has some flexibility to accommodate for natural expansion and contraction of the floor strips. This flexibility may be measured in terms of the maximum distance $\Delta$ that one floor strip may move away from its neighboring floor strip along one axis if both strips were installed without any separation along that axis. Preferably, the microlimitation on backlash $\Delta$ is no more than 0.020 inch and preferably less than 0.015 inch.

Figure 2:
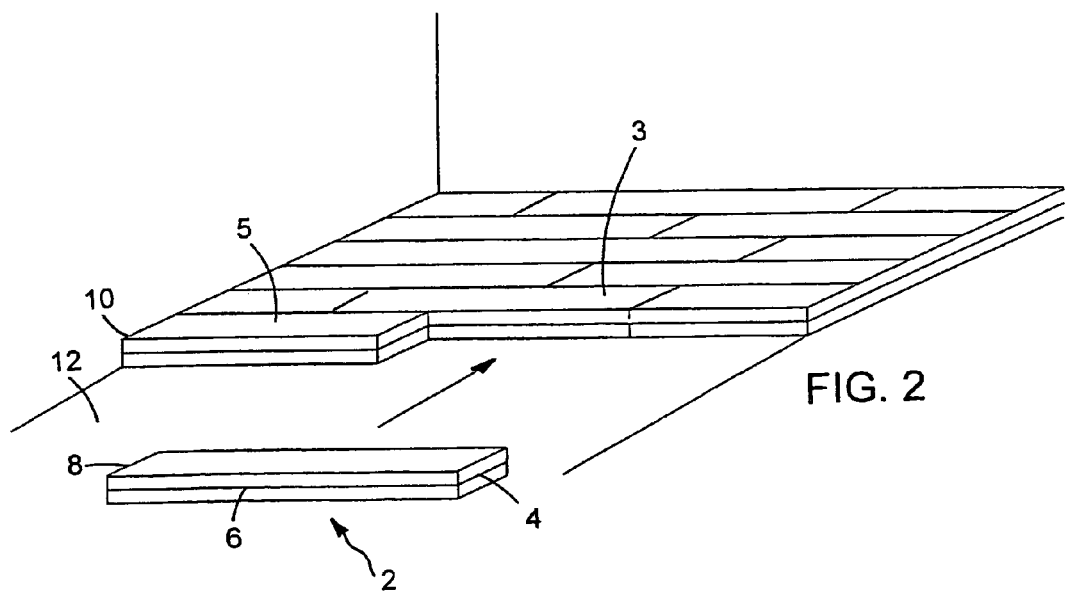
FIG. 2 is a perspective view of tongue and groove flooring strips with a hook and loop fastening system in the process of being installed.
Figure 3:
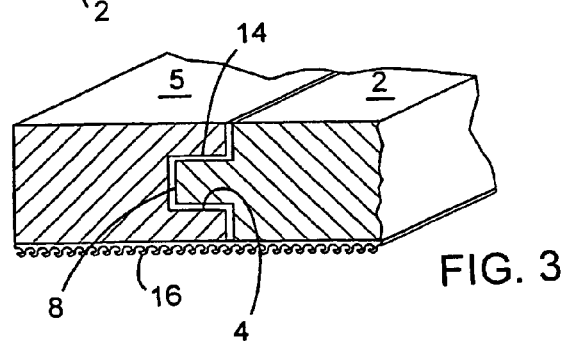
FIG. 3 shows a tongue and groove connection between adjacent flooring strips.

Tongue and groove floor strips are installed by laying the first row against a wall and then laying the subsequent rows next to each preceding row. As illustrated in FIG. 2, each row is formed from left to right with a long edge tongue 10 of the new strip 2 fitting into a long edge groove 6 of the preceding row strip 3. FIG. 3 shows how the short edge tongue 8 of strip 2 fits into a short edge groove 4 of the left strip 5. The flatness of the final floor is established by lining up (engaging) the top edge of the tongue with the top inner edge 14 of the groove. It should be noted that no adhesive is applied to the tongues and grooves so the tongue/groove mechanism only constrains motion of one floor strip relative to its neighbor in the vertical direction. As mentioned previously, the hook and loop fasteners constrain motion in the horizontal direction of each floor strip to the paper-loop sheet on the floor.

For wide area coverage applications involving rigid finish elements such as flooring strips, that, to achieve desired appearance and functionality of the flooring, the degree of permitted backlash must be critically limited. The term "backlash" refers to the lateral motion permitted of a rigid finish material at its hook and loop connection. It is realized that this motion should be limited, for example, to no more than about 0.020 inch, preferably less than about 0.015 inch, for acceptable joint gap stability in many applications. With such limitations, cracks at joints of the flooring elements remain sufficiently small and uniform to maintain a pleasing appearance over long periods of use and changing conditions.

It is realized, nevertheless, that the very small degree of freedom in the X-Y plane that is inherent with any hook and loop system, even if it conforms with this critical limit, is in fact useful. The limited motion is found to permit minor articulation between neighboring rigid units, permitting each unit to adapt to changes in its supporting surface and to changes in its own dimensions over time, without disturbing adjacent units. Accordingly, depending on the application, backlash of at least 0.001 inch, and preferably at least 0.004 inch, is desirable between adjacent, rigid units.

The micro-limited freedom of X-Y motion of the system depends critically on the combined performance parameters of limited-height and limited deflection loops of the hook-engageable loop material and of limited height hook elements (and in preferred examples, special attributes of the hook shapes as well) that interact with the loop material. At one level, the new micro-limited interaction is realized to be of potential usefulness no matter whether the loop material or the hook material is the fastener component which is first applied to cover the floor or other broad surface.

Backlash in hook-loop interaction can be controlled by selection of hook height and shape, as well as loop height and structure. For several applications we recommend a short hook, such as one of only 0.015 inch or less in height, paired with an un-napped, short loop. Low-loft non-woven loop materials, such as the Loop L3311 material described below, are particularly useful, as are very low-weight knits. Preferably, the loops are nominally less than 0.075 inch high, preferably 0.050 inch high or less.

Preferably, the loop material is comprised of a synthetic fiber material that has been stretched, effectively, in both X and Y directions, with at least 20 percent increase in area, preferably about 100 percent or more areal stretch, and stabilized in such stretched condition. In some cases, stabilization of the loop material is achieved by application of a fluid resinous binder, which, after stretching of the material, is cured to anchor the loops. The paper or other X-Y stable sheet is then laminated to the back of the loop material with an adhesive that is compatible with the binder resin.

In one example the loop material is comprised of a needled bat of staple fibers of about six inch uniform length that, after needling, has been stretched and stabilized. For instance the starting material is a bat of crimped staple fibers of 3 or 6 denier, or blends thereof, of a fiber-forming resinous material such as polyester. The limited penetration of the needles during needling of the bat followed by two directional stretching of the needled fabric, produces low-lying loop-defining fibers or 'loop trees' or 'loop bushes,' gatherings of such fiber loops distributed across the face of the material. The fiber loops may be anchored by an acrylic binder applied as a fluid foam to the back of the non-woven and cured by heating.

In other examples, other non-woven materials with suitable loop formations may be employed. Depending upon economics of the particular application, and desired performance characteristic, light-weight loop-defining knit materials may be used, such as a knitted material of basis weight less than 4 ounces per square yard, preferably 2 ounces or less per square yard including the weight of binder. Preferably, a fluid binder is applied by back coating. Following curing of the binder, an X-Y stable sheet is joined to form a loop laminate.

The stabilizing sheet material (e.g., the paper by itself) should have significant X-Y stiffness, but not too much three-dimensional rigidity that it cannot be rolled up for transport. In preferred cases, the lack of rigidity of this layer is such that it may be wound freely about a roll of less than 1 inch radius, preferably less than 0.5 inches and, in a free cantilever projection test, the preferred stabilizing sheet by itself will droop at projection lengths of less than 10 inches, preferably less than 6 inches.

An inexpensive material found suitable is Kraft paper to form such a laminate with the loop materials just described. It is preferably laminated to the loop material by an adhesive compatible with the resin of the binder of the loop material, the adhesive for instance having a thickness of 0.001 inch. Papers in the range of 20 to 90 pound Kraft paper can be employed, the choice depending upon the particular application and the characteristics of the loop-defining portions of the composite. In a preferred case for installing hardwood or engineered flooring strips, using the stretched and stabilized loop materials, 85 pound Kraft paper is employed.

Besides Kraft paper, paper with synthetic fiber content, or rag content, can be used, for instance paper fibers mixed with fibers produced from the resin of reclaimed PET soda bottles. Other suitable materials, depending upon the particular application, are materials with low creep and hydro-expansivity, including building wrap or other grades of polyethylene spun bonded and calendared material such as Tyvec™ available from DuPont, spun bonded polypropylene available as Remay™, and other X-Y stable materials, such as wet laid material known as Stripfil™ available from International Paper and polyester stitch bonded non-woven available under the tradename Tie Tex from Tie Tex Fabrics of Spartensburg, Ala.

For loop materials having binder of acrylic resin, it is found that a suitable composite is formed with 85 pound natural Kraft paper carrying a hot melt adhesive. For instance, the material Holland 85 pound natural Kraft coated heat seal material, available from Holland Manufacturing Inc. of Succasunna, N.J., is suitable. Suitable adhesive to be applied to Kraft paper are readily available from other sources. For instance, acrylic heat-activated adhesive compositions suitable for coating paper are available from Clifton Adhesives Inc of Wayne, N.J., from Michelman Products and from Reinhold Chemical Inc.

As an example, with a needled loop material of polyester fibers having a cured, back-applied acrylic binder that stabilizes the loop material in its stretched condition and anchors the loops, an acrylic hot melt adhesive is employed to laminate the loop material to the paper. For instance an 85 pound Kraft paper is provided pre-coated with such adhesive, and laminated to the low lying loop material with a hot calendar stack, employing resilient calender rolls.

The completed loop-paper composite formed as just described preferably has a Gurley stiffness of more than 500 milligrams, preferably more than 750 milligrams and in many cases most preferably of the order of 1000 milligrams or more, providing significant stiffness in the X-Y plane without significant three-dimensional rigidity. This material can be furnished in rolls wound upon a winding core, with the loop side positioned on the outer side of the wound material, so that any tendency to curl when laid down upon a floor does not tend to cause the free ends to curl up.

When floor strips are installed by nailing them to the floor, the individual strips may be slid horizontally into place to put the tongues into grooves and then nailed to the floor. However, with hook and loop fasteners, the hooks on the floor strips can prematurely engage with the loops of the paper-loop composite on the floor and prevent horizontal movement of the tongues into the grooves. To date, at least three different modes of installation have been developed.

Figure 4:
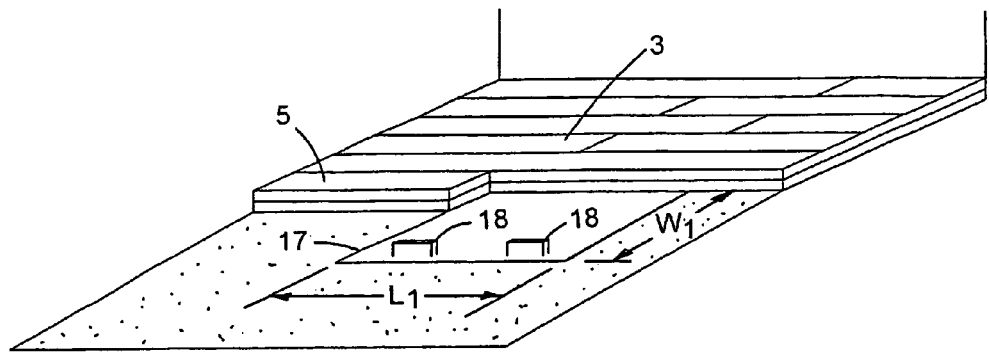
FIG. 4 shows a tool being used to install tongue and groove flooring strips with a hook and loop fastening system.

The first mode of installation is to use a tool with smooth surfaces and handles to prevent premature engagement of the hooks and the loops so that a new strip 2 may be slid into place. After the strip 2 is in place, the tool is slid out and used for the next strip. FIG. 4 shows the first step of placing tool 17 down where the new strip 2 is to be installed. The tool has handles 18 to facilitate handling of tool 17. Next, new strip 2 is placed on the tool and slid into place. Subsequently, tool 17 is removed and the settling of the installed floor strip 2 causes its hooks to engage with the underlying loops. The tool 17 should have a length $L_1$ greater than the length of the floor strip 2 and a width $W_1$ greater than three times the width of the floor strip 2. Since the floor strip 2 has a width of 3 inches and a length ranging from 10 inches to 80 inches, $W_1$ is thus at least 9 inches and $L_1$ is greater than 10 to 80 inches. The tool should be sufficient thin so that the long edge tongue of floor strip 2 can be completely inserted into the long edge groove of the previously installed floor strip 5.

Figure 6:
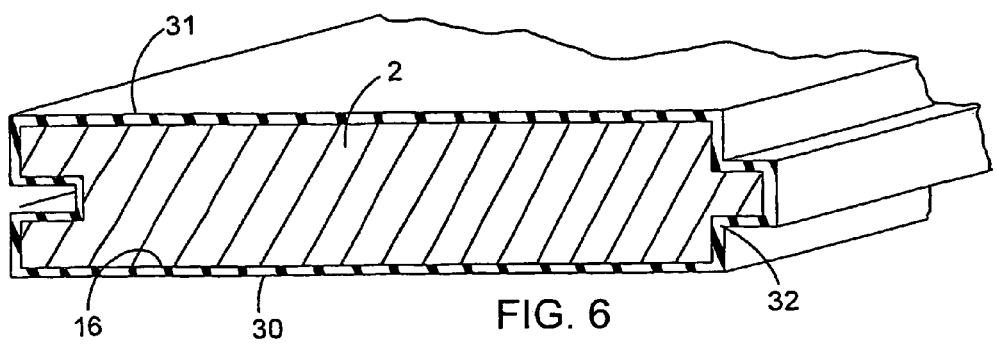
FIG. 6 is a perspective view of a tongue and groove flooring strip with a tightly wrapped tube cover.

The second mode of installation uses a plastic cover wrapped around each floor strip, which prevents premature engagement of the hooks with the loops during the horizontal sliding of the strip into place. This cover is preferably a tube of oriented polyethylene that is shrink-wrapped around each floor strip so that only the short edge tongue is exposed. FIG. 6 shows such a tube cover 30 heat-shrunk around a floor strip 2. This tube cover 30 protects the top finished surface 31 of the floor strip 2 in addition to preventing the hooks 16 from prematurely engaging with the loops 12 during installation. The tube cover 30 also has a perforated line just below the tongue of the floor strip 2 and a tear string 32 just above this perforated line. This perforated line and tear string 32 enable the user to tear the tube cover and pull it back away from the long edge tongue. Thus, the long edge tongue can be exposed and inserted into a groove without inserting the plastic cover also. The steps of installation with this cover are as follows. First, the user slides the covered floor strip 2 next to the previously installed floor strip so that the short edge tongue is partially inside the short edge groove of the previously installed floor strip. Care must be taken to slide the covered floor strip only to a point where there still is room to pull the tube cover 30 away from the long edge tongue. Next, the user pulls the tear string 32 from above the floor strip 2 so that the upper half of the tube cover 30 is away from the long edge tongue and the long edge tongue is exposed. Next, the user horizontally slides the floor strip 2 the rest of the way so that the long edge tongue is completely inserted into the long edge groove of a previously installed floor strip. Lastly, the user pulls off the rest of the tube cover 30. The settling of the installed floor strip 2 after the removal of the tube cover 30 causes its hooks 16 to engage with the underlying loops in the paper-loop composite.

Figure 5:
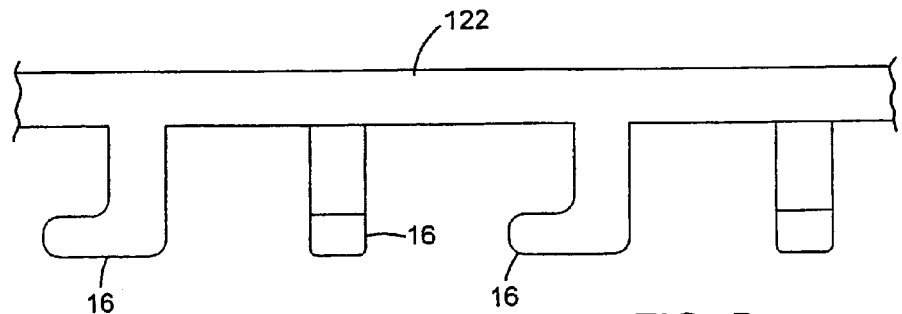
FIG. 5 is a side view of an arrangement of hooks to enable flooring installation without a special tool.

The third mode of installation uses a hook design for the hooks 16 on the backing layer of the floor strips, selected to cause the hooks to not engage with the loops of the paper-loop composite when they are slid across the loops in one direction. The hook arrangement is illustrated in FIG. 5. In this example, the hooks 16 are directed in three distinct directions, none of which has any component of extension in the direction in which the floor strip is to be slid during installation. This enables a floor strip 20 to be slid horizontally in one direction into position without engagement of the hooks 22 with loops 12. Once in position, the settling of the floor strip 2 engages the hooks 22 with loops 12 of the paper-loop composite on the floor.

Figure 7:
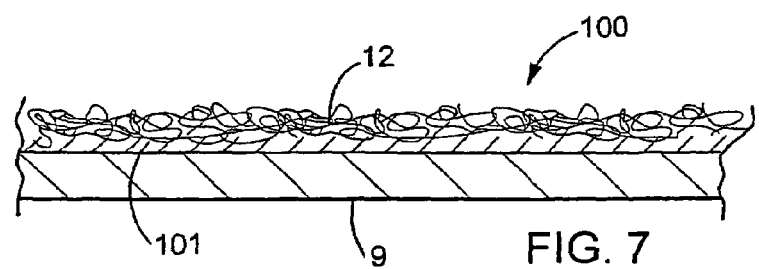
FIG. 7 is a side cross-sectional view of a loop-paper laminate material.

In one example shown in FIG. 7, a non-woven loop material 12 available as Loop L3311, of 3 denier crimped polyester fiber from Velcro USA was selected. It was formed following the general method disclosed in U.S. Pat. No. 6,342,285, from a needled bat of six inch length staple polyester fiber available from Troy Mills as Style #8373. Following needling, the material was stretched lengthwise and then received a binder coat of acrylic resin, BF Goodrich #TF-1030 and was stretched widthwise and the binder coat cured, all as described in the patent.

More specifically, the raw needled material of 45 inch width is received fan folded or in a roll of 45 inch width. It is first drawn in the machine direction sufficiently to neck in the width to 36 inch. Then it is placed on a tenter frame and stretched widthwise, to 62 inches while passing through an oven for curing. It continues at that width through the oven until cured. Using a standard material strength test, several samples 5 inch long by 1 inch wide of this L3311 material were measured to have an average modulus of elasticity of 3291.9 pounds per square inch with an average maximum load of 7.45 pounds and an average of 1.412 inches elongation. The web loop material thus comprises a non-woven web of entangled fibers, the fibers forming a sheet-form web body stabilized in a condition, preferably, of at least about 20 percent areal stretch. The resulting material has hook-engageable loops extending in clusters from tightened entanglements within the web body, the entanglements being joined together by straightened fibers. The web loop product preferably has a basis weight of less than about 4 ounces per square yard, with at least some of the fibers having a fiber denier of less than 3. In some cases, the web material includes a binder resin 101 anchoring hook-engageable fibers or yarns and constituting between about 20 percent and 40 percent of the weight of the material.

The paper product 9 selected to provide the X-Y stable backing was 85 pounds weight per 1000 square feet natural Kraft heat-seal paper, available from Holland Manufacturing Company, Inc. of Succasunna, N.J. The paper-loop composite product was formed by heat laminating the binder side of the loop material to the heat seal side of the 85 pound Kraft paper. For this heat lamination process a "Mini-Cal" calendar machine from Artex Corp of Fitchburg, Mass. was employed. The machine was outfitted with a with a steam heated top calendar roll and an un-heated bottom (backing) roll. Each roll had an elastomeric covering. The top roll had an estimated 90 durometer hard nonstick rubber-like coating of approximately 1/16 inch thick. The bottom roll had an estimated 60 durometer rubber-like coating approximately 1/8 inch thick. The laminating process ran at 347 degrees Fahrenheit, at 15 yards per minute, with nip pressure of 50 pounds per square inch.

In the process, first, the heat seal Kraft paper was laid atop the backing side of the loop material. The combination was then "S"-wrapped over the top roll, through the nip, and around the bottom of the bottom roll. The Kraft paper side of the assembly was lead against the heated roll. The loop material faced away from the heated roll, with its binder side in contact with the heat-seal coating of the paper.

The thickness of the resulting laminate 100 was measured by a thickness gauge Starrett 10158-441 using a 3/8 inch diameter foot, under loads of 1/2 ounce and 2 pounds. The light, half ounce, load measurement was selected to obtain measurement with the hook-engagable loops substantially extended, and the heavier, 2 pound, loading was selected to obtain measurement with the loops substantially compressed. Measurements obtained were, at 1/2 ounce load, a thickness of 0.022 inch with standard deviation of 0.011, and at a 2 pound load, a thickness of 0.017 inch with standard deviation of 0.0013

Under standard conditions, a sample of the paper-loop composite material of 1 inch width by 1 inch had a stiffness measured by a Gurly machine of 1420.8 milligrams along the machine direction; and 928 milligrams in a cross-machine direction. Using a standard material strength test, several 5 inch long by 1 inch wide samples of this paper-loop composite material were measured to have an average modulus of elasticity of 243,822 pounds per square inch with an average maximum load of 76.02 pounds and 0.11 inch maximum elongation.

Figure 8:
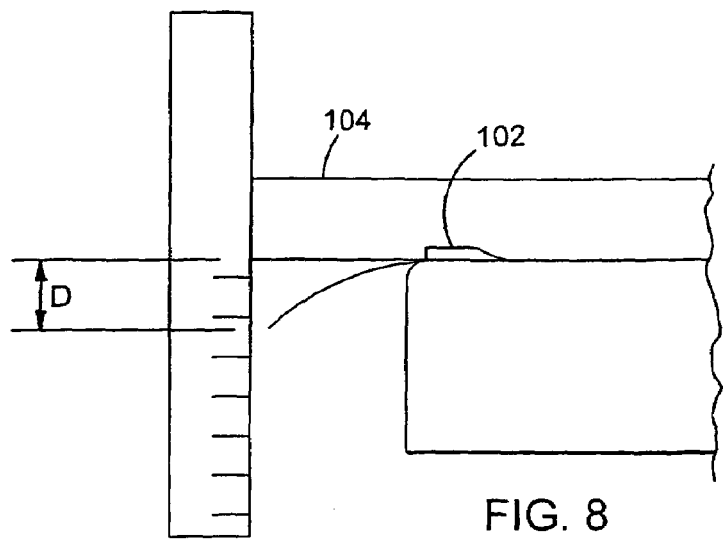
FIG. 8 illustrates a test to determine the droop of a flat sheet.

Samples were also prepared for a droop test as follows: 1 inch, 2 inch and 4×12 inch long test samples were produced from the L3311/85# Kraft paper laminate and visually inspected for flatness. Only ones which were flat and machine-direction oriented were used. A wooden ruler 102 was gapped at a table edge as shown in FIG. 8. The table's edge had a radius of approximately ¼ inch. A "T" scale 104 was used to mark the tabletop in one-inch increments, perpendicular to the table edge. The "T" scale was then oriented vertically as shown. The horizontal scale component was positioned perpendicular to the table edge and along the marked tabletop scale. The vertical component of the scale was moved outwardly during testing so as to be positioned at the leading edge of the sample's extension. Samples were slid under the gapped ruler, and aligned perpendicular to the table edge. The samples were then pushed (extended) beyond the table's edge in one-inch increments. At each increment the droop "D" was measured and recorded. No samples were tested more than once.

All test samples began to droop at a cantilever length of 4 inches, and none of the samples was stiff enough to resist deflection beyond a 4 inch extension. All of the test samples exhibited significant deflection (droop) at extensions beyond six inches. None of the test samples had sufficient 3-dimensional-rigidity as to protrude horizontally up to 10 inches.

To demonstrate the capability of the laminate of 3 denier, L3311 loop material with 85# Kraft paper laminate to bend around a radius, a bend radius test was conducted. Strips of the 3311/Kraft laminate were prepared into widths of one to four inches, all at 17.125 inch length. Test strips were prepared in both machine and cross-machine directions. Each test strip was oriented either loop in or loop out, and its free end secured with staples 108 to form a teardrop loop 106 as in FIG. 9. Both a ⅜ inch diameter rod and a 0.125 inch diameter rod were "C"-clamped to the edge of a table to form cantilevered support rods. As shown in FIG. 10, each teardrop form 106 was then placed on the test rod 130, with the stapled ends oriented down, and a ⅜ inch×2 inch stub shaft 132 inserted into the resulting "V" notch at the bottom of the sample. A spring type paper clamp 134 was then assembled over the sandwiched stub shaft, and a weight hanger 136 was hooked through one of the open clip tabs.

Each 3311/Kraft laminate sample was loaded by adding 1 pound incremental loads to the weight hanger 136, until the sample bent to contact the support rod 130 about a full 180 degrees. We found that the L3311/Kraft laminate material could be wrapped around even small radii without deformation. A radius as small as 1/16 inch was easily wrapped. The test results did not seem to be affected significantly by whether the loop sides were oriented in or out, or by whether the samples were cut to be oriented in either a machine or cross-machine direction.

To measure the suitability of the laminate for use in securing flooring and other adjacent, rigid surface coverings with minimal gap variation under load, a floor movement test was conducted on the flooring arrangement shown in FIG. 1, using the loop-paper laminate described above. Holes were drilled partially through individual floor strips, and 10 pound lateral loads were applied across the width of the strip by a spring scale secured to the holes. The gap at the edge of the strip, opposite the direction of pull, was measured before and with a 10 pound load. We found that, on average, the gap increased on average only about 0.012 inch, making the composite quite suitable for many applications.

The loop-paper composite described above is flexible enough to be readily rolled up for storage and transport, the paper giving the composite the necessary dimensional stability for easy rolling and unrolling. Once transported to a work site, the composite may be unrolled directly into place, and secured to a supporting structure either by an adhesive, such as an adhesive pre-applied to the paper surface, or by mechanical means such as staples.

Figure 11:
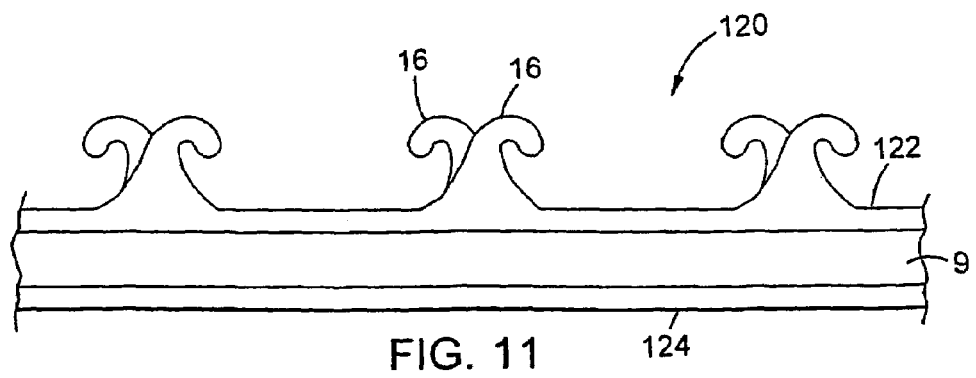
FIG. 11 is a side view of a hook-paper composite material.

Likewise, a hook-paper fastener composite 120 may be provided in wide widths, as shown in FIG. 11. This material is a laminate of paper 9 with a thin film 122 of resin with which a large array of fastener element stems are integrally formed. The fastener element stems, or complete fastener elements 16, may be formed in a molding nip into which the paper and a layer of molten resin is introduced, as disclosed by Kennedy et al. in U.S. Pat. No. 5,260,015, and by Murasaki et al. in U.S. Pat. No. 5,441,687. Molded stems may be post-formed into functional loop-engaging fastener elements, as known in the art. Particularly wide hook-paper composites may be formed by first molding an array of fastener element stems or complete fasteners extending from a sheet-form resin base, and then, prior to lamination, laterally stretching the molded base to greatly increase its width, as taught in U.S. Pat. No. 6,035,498.

It is preferable that the hooks have a profile, or be of a combined arrangement, that results in equal backlash in all directions, such that the fastening rigidity is isotropic. A suitable hook form is a flat topped stem, with limited stem height and head height, such as HOOK60 available from Velcro, USA.

As with the loop-paper composite already discussed, hook-paper composite 120 can be provided with a layer of adhesive 124, such as a gum adhesive, on its obverse side. The hook-paper composite is also flexible enough to be rolled up for transport and storage, but laterally stiff enough to maintain its in-plane dimensions during rolling, and to avoid kinking and creasing.

Either of the hook-paper laminates and the loop-paper laminates discussed above is suitable for either horizontal installation, such as in the flooring installation discussed above, or for vertical installation. For example, either composite material can be applied to a vertical wall surface, such as a non-treated wallboard surface, with the fastening side exposed for releasably mounting wallpaper or paneling.

The paper side of either composite may also include a resin film or coating, such as of polyethylene, to serve as a vapor barrier or heat seal in use. The coating can be provided on the paper prior to lamination to the fastener component of the composite, or applied later. In the case of the hook-paper laminate, the hook resin can extend in a solid film across the width of the composite to serve as a vapor barrier. Alternatively, the hooks and base can be molded in strips extending along the back of the paper, with exposed paper between the strips. The paper coating may be incompatible with the resin of which the hooks are being formed. For instance, a polyethylene coated or laminated film may be pre-applied to the paper to provide moisture resistance to the backside of the product, and provide a desired vapor barrier.

In addition, other functional layers can be provided. As examples, a fire retarding layer; a synthetic-impregnated layer to combat loss of strength with humidity; paper or other laced with insecticides to fight cockroaches; papers or other layers laced with fungicide to prevent growth of mold; papers or other layers laced with rodent repellant. Similarly, a cushioning layer, for instance, of plastic foam may be applied to the backside of the paper, the paper-foam interaction to be firmly joined to the composite despite incomparability of the resin of the foam with the resin of which the fasteners are being molded. The loop binder or hot melt laminating layer, or both, may be foamed to provide cushioning as well as binding and marrying effects. Both open and closed cell foam can be used for this purpose.

Special papers can also be employed for different advantages. Glassine paper, for instance, can provide a barrier to transfer of grease or residual adhesives on a sub floor. The paper can carry an antifriction coating, such as talc or PTFE, to improve slippage for free floating of the composite material on the floor.

Other useful finish materials provided with hooks may be laid employing the techniques described here. For instance, wood or composite parquet, vinyl or plastic tiles, and ceramic tiles (to be grouted with silicone tub grout).

Relevant details can also be found in the following U.S. patents, all of which are hereby incorporated by reference: U.S. Pat. Nos. 6,342,285, 5,260,015, 5,441,687 and 6,035,498.

Other embodiments will also be apparent to those of skill in the art, and will be understood to fall within the following claims.

What is claimed is:

1. A flexible building construction laminate having
    a fastening side comprising a sheet-form fastener component with hook-engageable loops defined by a knit or non-woven web material having a basis weight of less than about 4 ounces per square yard, and
    an opposite side formed by a sheet of paper comprising a vapor barrier coating or resin film vapor barrier and adhesively laminated to the fastener component,
    the paper significantly stiffening the web material against stretching in a plane of the laminate, the laminate having a Gurley stiffness of more than 500 milligrams, while
    the paper is of such flexibility that it may be wound freely about a roll of less than one inch radius, such that the laminate remains sufficiently flexible to be rolled up for storage and transport.

2. The laminate of claim 1 wherein the sheet-form fastener component is in a laterally stretched condition as laminated to the paper.

3. The laminate of claim 1 wherein the paper has a lateral stiffness at least as great as that of 85 pound Kraft paper.

4. The laminate of claim 1 wherein the web material comprises a non-woven web of entangled fibers, the fibers forming a sheet-form web body stabilized in a condition of at least about 50 percent areal stretch.

5. The laminate of claim 1 wherein the web material comprises a non-woven web of entangled fibers, the fibers forming a sheet-form web body stabilized in a condition of at least about 20 percent areal stretch, in which hook-engageable loops extend in clusters from tightened entanglements within the web body, the entanglements being joined together by straightened fibers, at least some of the fibers having a fiber denier of less than 3.

6. The laminate of claim 1 wherein the web material comprises a non-woven web of entangled fibers and includes a binder resin anchoring hook-engageable fibers or yarns and constituting between about 20 percent and 40 percent of the weight of the material.

7. The laminate of claim 1 in roll form, with the fastening side directed inwardly.

8. The laminate of claim 1 wherein the paper has an exposed surface suitable for printing or writing thereupon.

9. The laminate of claim 1 wherein the knit or non-woven web material has a basis weight of less than about 2 ounces per square yard.

10. The laminate of claim 1 wherein the material comprises a lightweight knit.

11. The laminate of claim 1 having a Gurley stiffness of more than 750 milligrams.

12. The laminate of claim 1 having a Gurley stiffness of more than 1000 milligrams.

13. The laminate of claim 1 wherein the paper is of such flexibility that it may be wound freely about a roll of less than one-half inch radius.

14. The laminate of claim 1 wherein the paper is of such flexibility that it will droop at projection lengths of less than 6 inches in a free cantilever projection test.

15. The laminate of claim 1 wherein the paper is between 20 and 90 pound Kraft paper.

16. The laminate of claim 1 wherein the hook-engageable loops are nominally less than 0.075 inch high.

17. The laminate of claim 1 further comprising an insecticide.

18. The laminate of claim 1 further comprising a fungicide.

19. The laminate of claim 1 further comprising a rodent repellant.

20. The laminate of claim 1 wherein the paper comprises Glassine paper.

21. The laminate of claim 1 wherein the paper is coated with an antifriction coating.

22. A flexible building construction laminate having
    a fastening side comprising a sheet-form fastener component with hook-engageable loops defined by a knit or non-woven web material having a basis weight of less than about 4 ounces per square yard,
    an opposite side formed by a sheet of paper adhesively laminated to the fastener component,
    the paper significantly stiffening the web material against stretching in a plane of the laminate, the laminate having a Gurley stiffness of more than 500 milligrams, while
    the paper is of such flexibility that it may be wound freely about a roll of less than one inch radius, such that the laminate remains sufficiently flexible to be rolled up for storage and transport, and
    an insecticide on one of the paper and the fastener component.

23. A flexible building construction laminate having
    a fastening side comprising a sheet-form fastener component with hook-engageable loops defined by a knit or non-woven web material having a basis weight of less than about 4 ounces per square yard,
    an opposite side formed by a sheet of paper adhesively laminated to the fastener component,
    the paper significantly stiffening the web material against stretching in a plane of the laminate, the laminate having a Gurley stiffness of more than 500 milligrams, while
    the paper is of such flexibility that it may be wound freely about a roll of less than one inch radius, such that the laminate remains sufficiently flexible to be rolled up for storage and transport, and
    a fungicide on one of the paper and the fastener component.

24. A flexible building construction laminate having
    a fastening side comprising a sheet-form fastener component with hook-engageable loops defined by a knit or non-woven web material having a basis weight of less than about 4 ounces per square yard,
    an opposite side formed by a sheet of paper adhesively laminated to the fastener component,
    the paper significantly stiffening the web material against stretching in a plane of the laminate, the laminate having a Gurley stiffness of more than 500 milligrams, while the paper is of such flexibility that it may be wound freely about a roll of less than one inch radius, such that the laminate remains sufficiently flexible to be rolled up for storage and transport, and a rodent repellant on one of the paper and the fastener component.

25. A flexible building construction laminate having a fastening side comprising a sheet-form fastener component with hook-engageable loops defined by a knit or non-woven web material having a basis weight of less than about 4 ounces per square yard, and an opposite side formed by a sheet of Glassine paper adhesively laminated to the fastener component, the paper significantly stiffening the web material against stretching in a plane of the laminate, the laminate having a Gurley stiffness of more than 500 milligrams, while the paper is of such flexibility that it may be wound freely about a roll of less than one inch radius, such that the laminate remains sufficiently flexible to be rolled up for storage and transport.

26. The laminate of claim 25 wherein the sheet-form fastener component is in a laterally stretched condition as laminated to the paper.

27. The laminate of claim 25 wherein the web material comprises a non-woven web of entangled fibers, the fibers forming a sheet-form web body stabilized in a condition of at least about 20 percent areal stretch.

28. The laminate of claim 27, wherein hook-engageable loops extend in clusters from tightened entanglements within the web body, the entanglements being joined together by straightened fibers, at least some of the fibers having a fiber denier of less than 3.

29. The laminate of claim 25 wherein the web material comprises a non-woven web of entangled fibers and includes a binder resin anchoring hook-engageable fibers or yarns and constituting between about 20 percent and 40 percent of the weight of the material.

30. A flexible building construction laminate having a fastening side comprising a sheet-form fastener component with hook-engageable loops defined by a knit or non-woven web material having a basis weight of less than about 4 ounces per square yard, and an opposite side formed by a sheet of paper coated with an antifriction coating and adhesively laminated to the fastener component, the paper significantly stiffening the web material against stretching in a plane of the laminate, the laminate having a Gurley stiffness of more than 500 milligrams, while the paper is of such flexibility that it may be wound freely about a roll of less than one inch radius, such that the laminate remains sufficiently flexible to be rolled up for storage and transport.

31. The laminate of claim 30 wherein the sheet-form fastener component is in a laterally stretched condition as laminated to the paper.

32. The laminate of claim 30 wherein the web material comprises a non-woven web of entangled fibers, the fibers forming a sheet-form web body stabilized in a condition of at least about 20 percent areal stretch.

33. The laminate of claim 32, wherein hook-engageable loops extend in clusters from tightened entanglements within the web body, the entanglements being joined together by straightened fibers, at least some of the fibers having a fiber denier of less than 3.

34. The laminate of claim 30 wherein the paper is between 20 and 90 pound Kraft paper.

35. The laminate of claim 30 wherein the web material comprises a non-woven web of entangled fibers and includes a binder resin anchoring hook-engageable fibers or yarns and constituting between about 20 percent and 40 percent of the weight of the material.

* * * * *